INVENTOR.
ARTHUR S. KISH

BY
*Isler & Ornstein*

ATTORNEYS

Sept. 30, 1969            A. S. KISH            3,469,599
UNIVERSAL FITTINGS FOR ATTACHMENT TO
COMPRESSOR HEADS AND THE LIKE Filed Sept. 12, 1967            2 Sheets-Sheet 2

INVENTOR.
ARTHUR S. KISH
BY
*Isler & Ornstein*
ATTORNEYS

United States Patent Office 3,469,599
Patented Sept. 30, 1969

3,469,599
UNIVERSAL FITTINGS FOR ATTACHMENT TO COMPRESSOR HEADS AND THE LIKE
Arthur S. Kish, Lyndhurst, Ohio, assignor to Murray Corporation, Cockeysville, Md., a corporation of Maryland
Filed Sept. 12, 1967, Ser. No. 667,161
Int. Cl. F16k *45/00;* F17d *3/00;* F04b *39/10*
U.S. Cl. 137—587                                              9 Claims

ABSTRACT OF THE DISCLOSURE

The invention is concerned with the provision of fittings for attachment to the compressor heads of automotive air-conditioning systems, wherein each fitting comprises an adapter having a tube extending radially therefrom and a top cap having a valve extending radially therefrom, and the adapter and top cap are rotatable relatively to each other to adjust the angularities between the tubes and valves, for the purpose of accommodating the angular positions of these parts to the positions of the refrigerant lines or conduits.

---

This invention relates generally to fittings which are adapted for attachment to the heads of compressors used in automotive air-conditioning systems.

A primary object of the invention is to provide a fitting of the character described, consisting of assembled parts which are rotatable relatively to each other for the purpose of positioning or adjusting the parts at any desired angle to each other, as necessitated or required for connection to the refrigerant lines or conduits.

Another object of the invention is to provide a fitting of the character described, consisting of parts which are maintained in assembled relation by clamping elements which also function to secure the fittings to the head of the compressor.

A further object of the invention is to provide a fitting of the character described, which is of novel construction and the parts of which are assembled in such manner as to provide a leakproof seal.

Other objects and advantages of my invention will be apparent during the course of the following description.

In the accompanying drawings forming a part of this specification, and in which like numerals are employed to designate like parts throughout the same, FIG. 1 is a top plan view, showing inlet and outlet fittings embodying the invention clamped to the head of a compressor of an automotive air-conditioning system;

Figure 1:
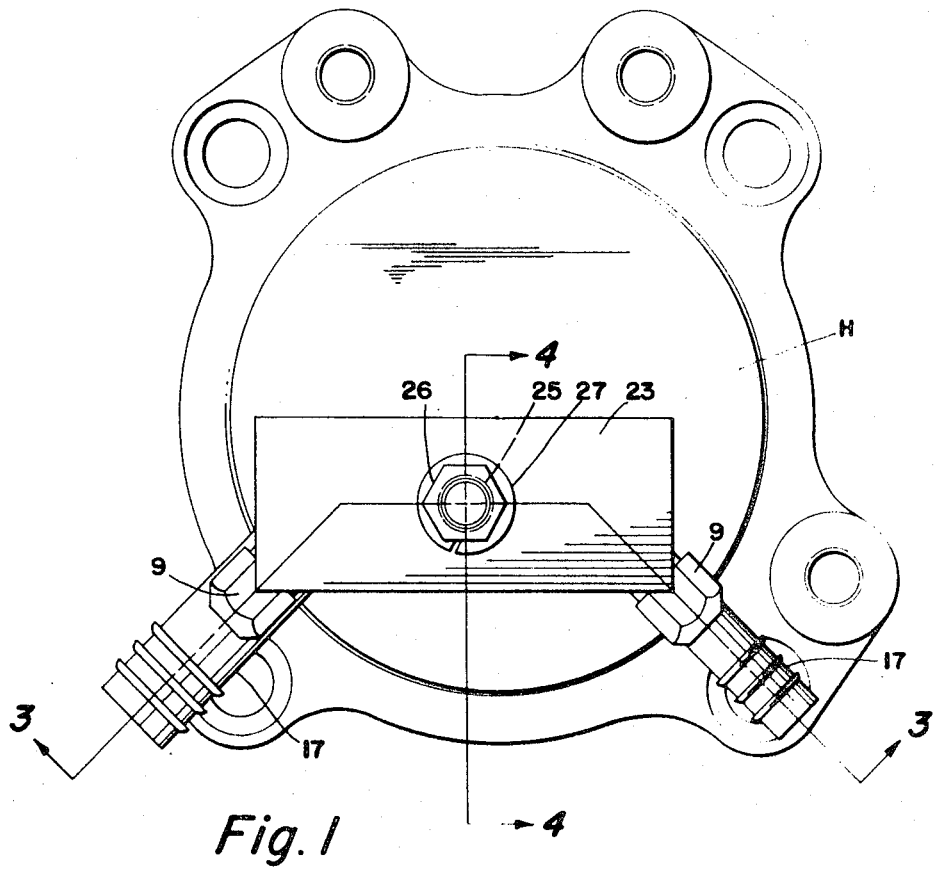
Figure 2:
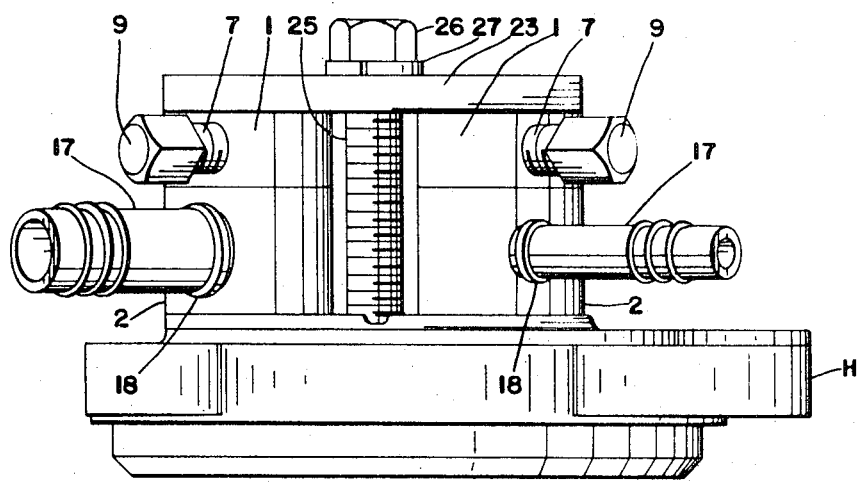
FIG. 2 is a front elevational view of the parts shown in FIG. 1.
Figure 3:
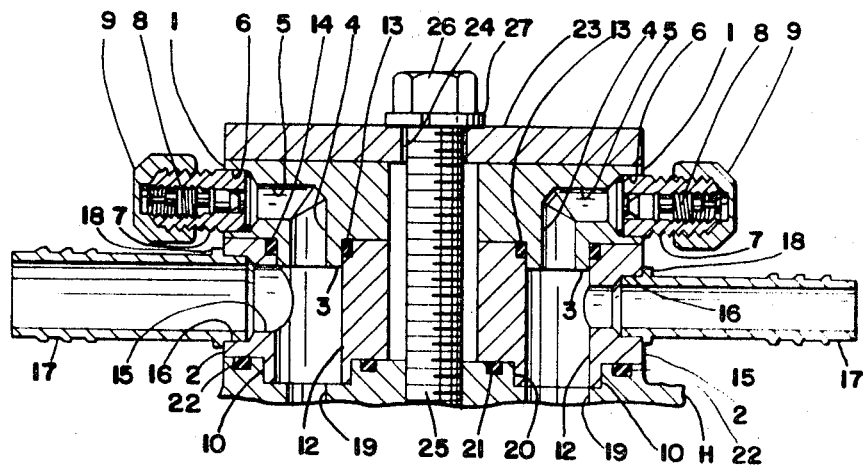
FIG. 3 is a fragmentary cross-sectional view, taken on the line 3—3 of FIG. 1.
Figure 4:
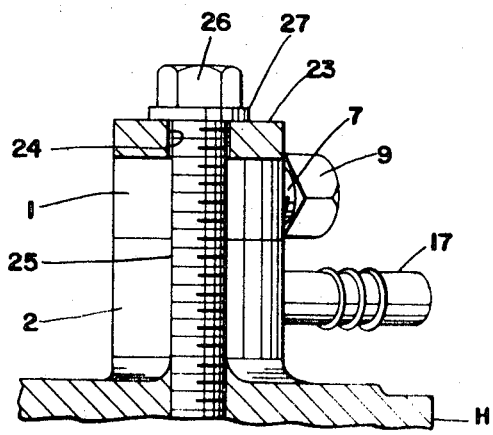
FIG. 4 is a fragmentary cross-sectional view, taken on the line 4—4 of FIG. 1.

Referring more particularly to the drawings, each of the fittings will be seen to comprise of a top cap 1 and a bottom adapter 2.

The top cap 1 is of cylindrical or circular form, and is provided with a central annular extension 3, the function of which will be presently described.

The top cap is also provided with an axial passageway 4, and with a radial passageway or valve core port 5, which communicates at its inner end with the upper end of the passageway 4.

The passageway 5 is counterbored, as at 6, to threadedly receive a valve consisting of a valve port adapter 7, needle valve 8 and seal cap 9. The needle valve 8 is the conventional type of "bicycle" tire valve, that is to say, it is a self-closing type of valve, which is used to evacuate the air-conditioning system before charging it with the refrigerant fluid, and to charge the system with the refrigerant fluid. When the system is ready for operation, the valves are closed or sealed by means of the seal caps 9.

The bottom adapter 2 is also of cylindrical or circular form, and is provided with a central annular extension 10, the function of which will be presently described.

The bottom adapter 2 is also provided with an axial passageway 12, the upper end of which is counterbored to provide an annular recess 13 which is adapted to receive an O-ring seal 14.

The bottom adapter 2 is further provided with a radial passageway 15 which communicates with the passageway 12, and the outer end of which is counterbored as at 16 to receive one end of a tube 17, adapted for connection to one of the refrigerant lines or conduits (not shown) which extends from the compressor to other parts of the air-conditioning system. As will be readily understood, one of the tubes 17 is an inlet tube, and the other is an outlet tube. The tube 17 has an annular flange 18 adapted to abut the outer wall of the adapter 2. The tube 17 is copper-brazed or otherwise joined to the adapter.

In assembling the parts of the fittings to each other, and the assemblies to the compressor head H, the procedure is as follows:

The compressor head is provided with a port 19, which is counterbored, as at 20, to receive the extension 10 of the bottom adapter 2. The head is provided with an annular recess 21 which is concentric with the counterbore 20, and has disposed therein an O-ring seal 22, so that when the adapter 2 is mounted on the head, a fluid-tight seal is provided between the head and adapter.

The top cap 1 is then mounted on the adapter 2, with the extension 3 thereof extending into the passageway 12 of the adapter. The O-ring seal 14 is then effective to provide a fluid-tight seal between the cap 1 and adapter 2.

After the fittings have been thus assembled, they are clamped to the head H of the compressor by means of a clamp bar 23 which overlies the top cap 1.

The clamp bar 23 is provided with a central opening 24, through which a threaded stud 25 extends. The stud 25 is threadedly secured to the head H, and a nut 26 is secured to the upper end of the stud for the purpose of forcing the clamp bar 23 to its clamping position. A spring washer 27 is interposed between the clamp bar and the nut.

With the fittings thus assembled, and the assemblies thus clamped to the compressor head, the top caps may be rotated to any desired position in relation to the bottom adapters, or the bottom adapter may be rotated to any desired position in relation to the top caps, for the purpose of adjusting the angular relations of the valves to the tubes 17, or vice versa, so as to accommodate these angular positions to the positions of the refrigerant lines or conduits.

Moreover, these rotational movements or angular adjustments may be made without breaking the seals between the fittings and the compressor head, or the seals between the top caps and the bottom adapters, since the O-ring seals maintain a fluid-tight seal at all times.

It may be noted, further, that the parts of the fittings are assembled without the use of extraneous fasteners or screws or other fastening elements, other than the clamping bar 23, stud 25 and nut 26, which latter parts thus serve the dual purpose of holding the fittings in assembled relation as well as a means of mounting the fittings on the compressor head.

Having thus described my invention, I claim:
1. A fitting for the head of a compressor of an air conditioning system, said fitting comprising a bottom adapter having a cylindrical outer wall, a tube extending radially outwardly from said outer wall, and a top cap mounted on said adapter in axial alignment therewith and having a cylindrical outer wall of substantially the same diameter as the outer wall of said adapter and having a valve extending radially outwardly from its outer wall, said top cap being rotatable about the axis of said adapter whereby to vary the angularity of said valve in relation to said tube.

2. A fitting, as defined in claim 1, wherein said bottom adapter has an axial passageway having a counterbore at its upper end, and an O-ring seal disposed in said counterbore, and said top cap is provided with a central annular extension extending into said passageway, whereby lateral movement of said top cap relatively to said bottom adapter is prevented.

3. A fitting, as defined in claim 2, wherein said top cap has a passageway in axial alignment with said first named passageway, and a radial passageway communicating the upper end of said second-named passageway with said valve.

4. A fitting, as defined in claim 3, wherein said bottom adapter has a radial passageway communicating with said first-named passageway and said tube.

5. A fitting, as defined in claim 4, wherein said bottom adapter is provided with an annular extension concentric with said axis and adapted for insertion in the head of a compressor.

6. In combination with the head of a compressor or the like, spaced fittings, each comprising an adapter having a tube extending radially therefrom and a top cap having a valve extending radially therefrom, and means for clamping said fittings to said compressor head.

7. The combination, as recited in claim 6, wherein said means comprises a clamp bar straddling said top caps, a threaded stud extending through said bar and secured to said compressor head, and a nut secured to the upper end of said stud.

8. The combination, as recited in claim 7, wherein said stud extends through the space between said fittings.

9. In combination with the head of a compressor or the like, spaced fittings, each comprising an adapter having a tube extending radially therefrom and a top cap having a valve extending radially therefrom, said adapter and top cap being interfitted with each other to permit rotational movement of one relatively to the other, and means for clamping said fittings to said compressor head, said means comprising a clamp bar straddling said top caps, a threaded stud extending through said bar and through the space between said fittings and secured to said compressor head, and a nut secured to the upper end of said stud.

References Cited

UNITED STATES PATENTS

| 1,518,221 | 12/1924 | Reiber | 137—270 |
| 2,007,270 | 7/1935 | Dodge | 137—270 X |
| 2,433,414 | 12/1947 | Annin | 137—270 |
| 2,638,243 | 5/1953 | Davies. | |

FOREIGN PATENTS 164,210  10/1949  Austria.

M. CARY NELSON, Primary Examiner

WILLIAM R. CLINE, Assistant Examiner

U.S. Cl. X.R.

137—615; 230—228